March 31, 1959  T. J. WEIR  2,879,755
FLUID COUPLING MECHANISM
Filed May 2, 1956  5 Sheets-Sheet 1

INVENTOR.
THOMAS J. WEIR.
BY
Lockwood, Galt, Woodard & Smith
ATTORNEYS.

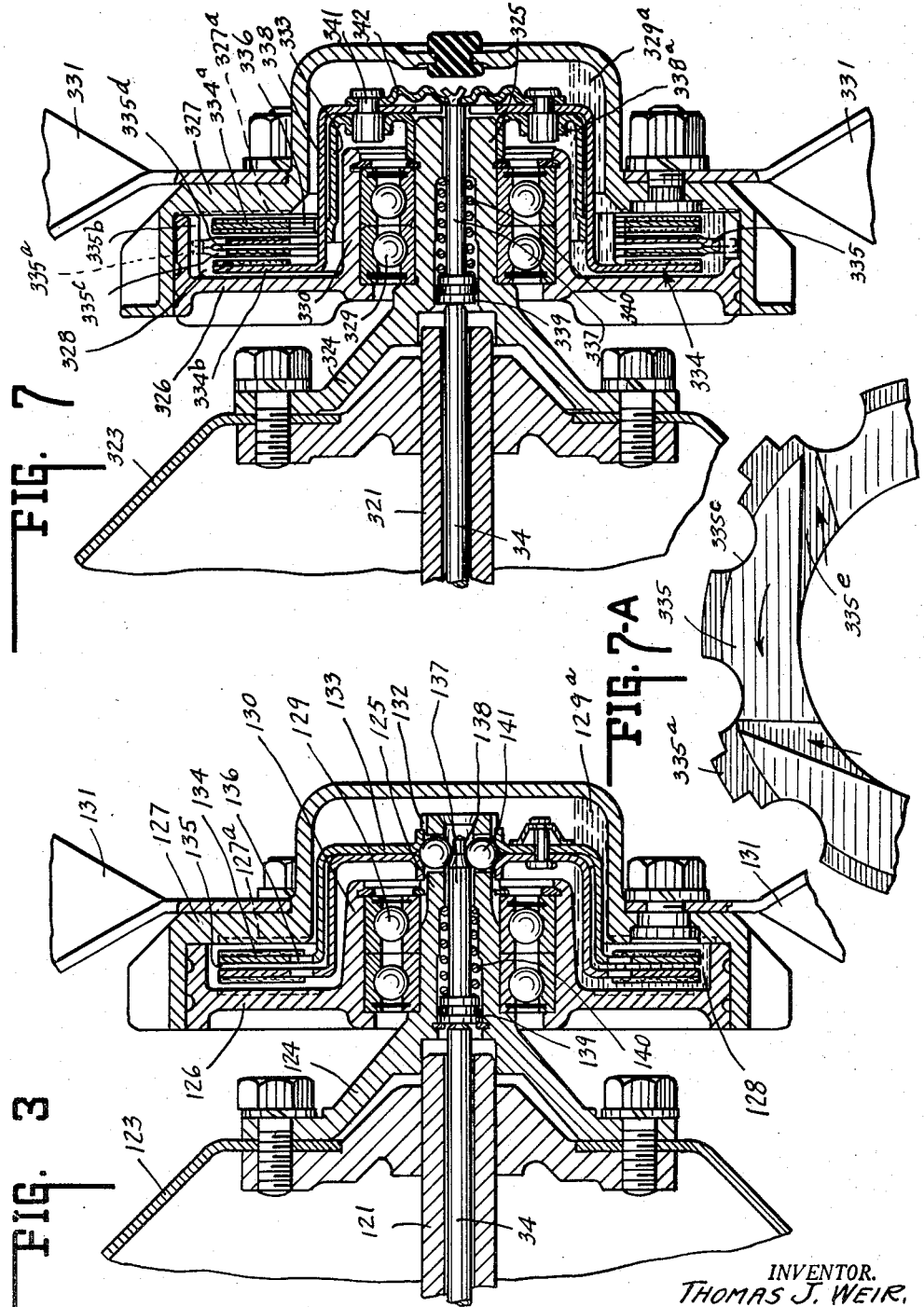

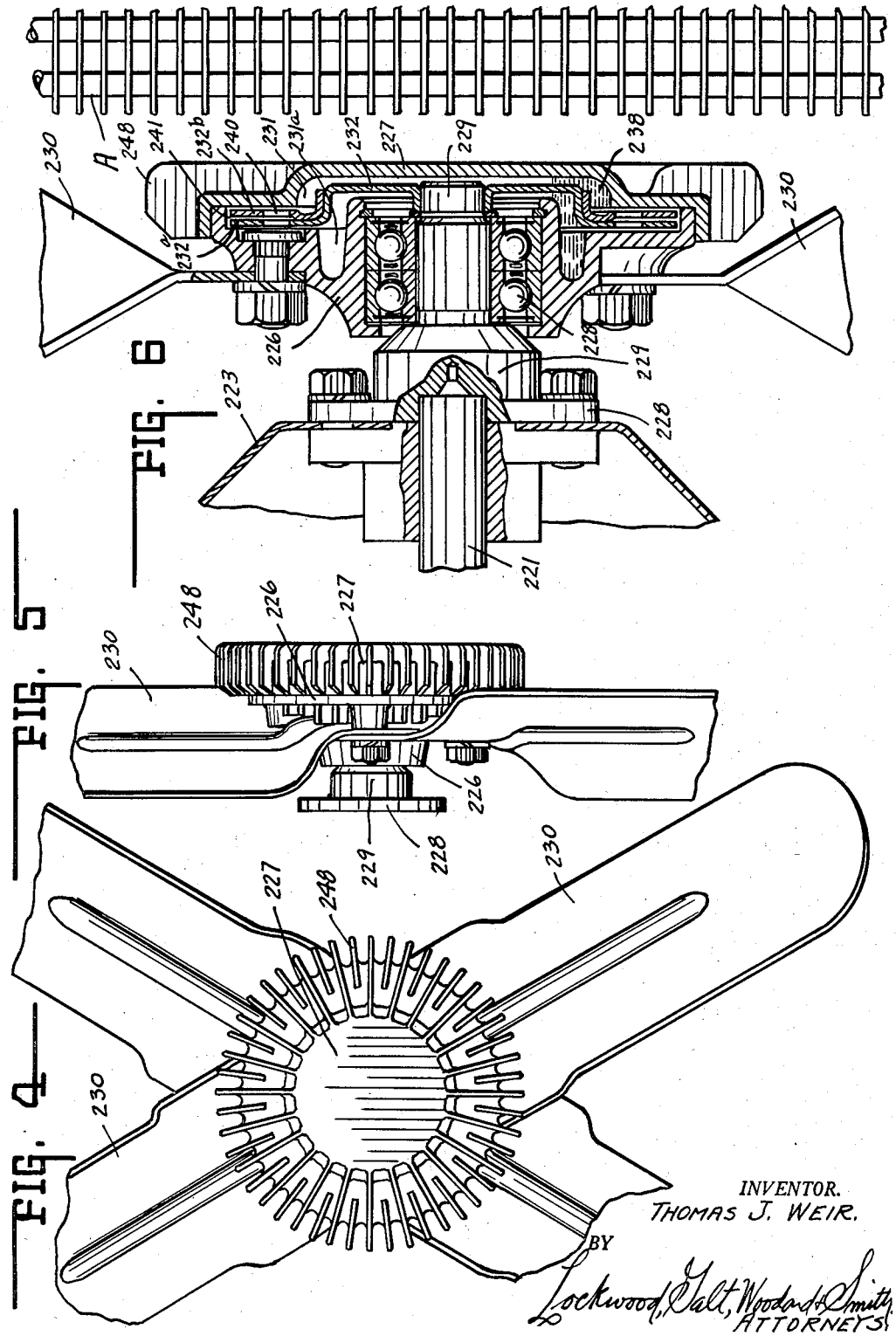

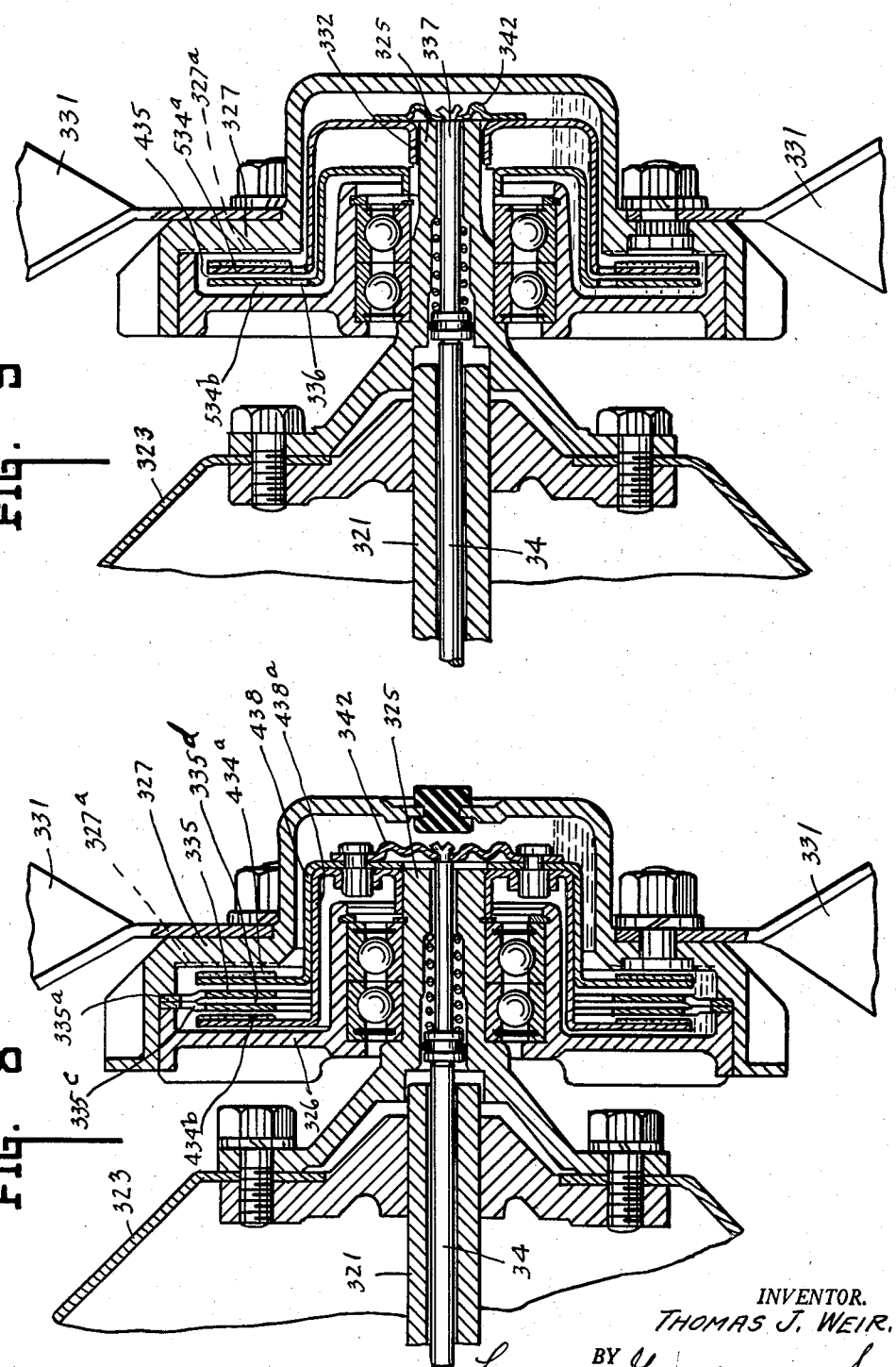

March 31, 1959 T. J. WEIR 2,879,755
FLUID COUPLING MECHANISM
Filed May 2, 1956 5 Sheets-Sheet 5
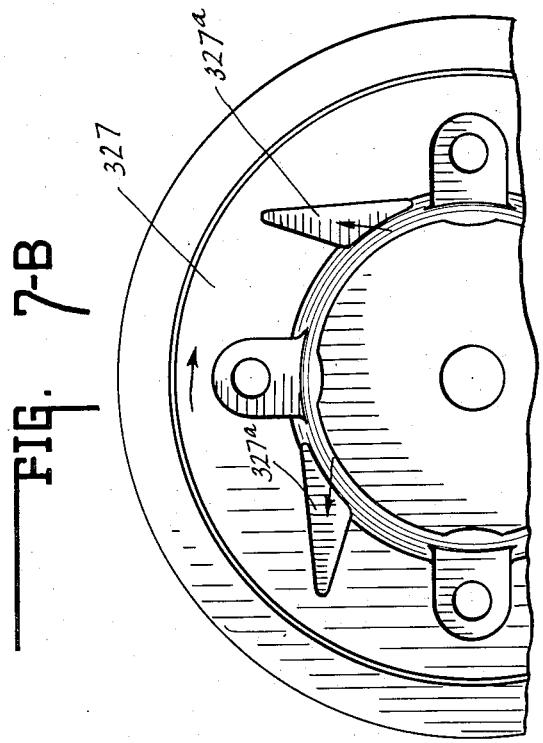
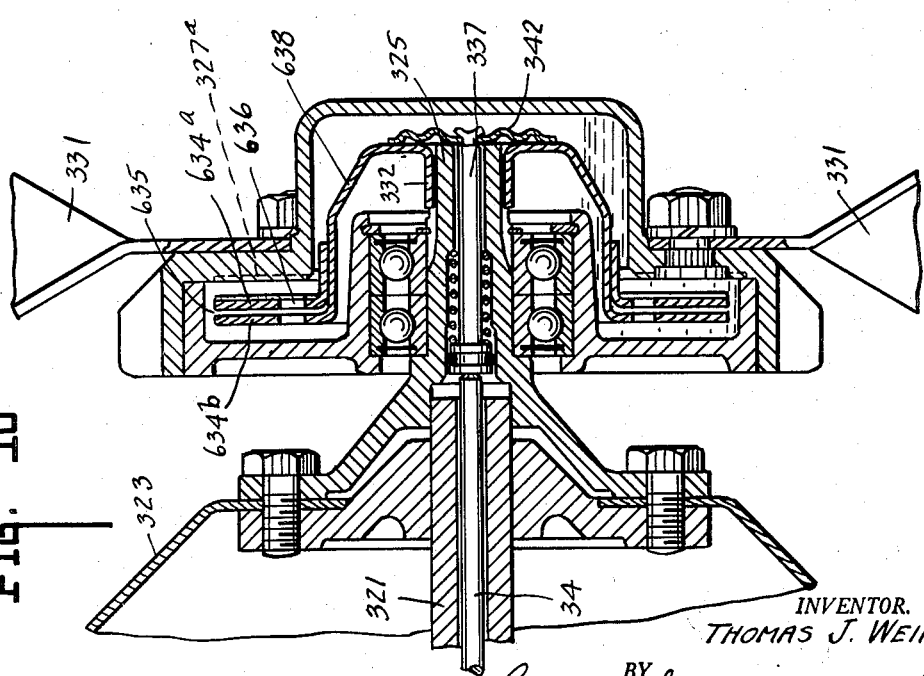
INVENTOR.
THOMAS J. WEIR.
BY
Lockwood, Galt, Woodard & Smith
ATTORNEYS.

United States Patent Office 2,879,755
Patented Mar. 31, 1959

2,879,755

FLUID COUPLING MECHANISM

Thomas J. Weir, Indianapolis, Ind., assignor to Schwitzer Corporation, Indianapolis, Ind., a corporation Application May 2, 1956, Serial No. 582,187

22 Claims. (Cl. 123—41.12)

This invention relates to a fluid coupling for driving accessory devices such as are commonly associated with an internal combustion engine or any similar driving means. Such appliance, for example, may include a radiator cooling fan, electric generator, air conditioner, compressor or water pump.

Generally speaking, the power consumed by such accessories increases as the speed of the engine or driving means increases, but in many instances the demand for the useful output of such a driven appliance, beyond a certain maximum speed, increases, if at all, at a rate much less than that resulting from the increase in speed of the driving means or engine. A notable example of this condition is the radiator cooling fan. If such accessory is coupled directly to the engine, the power consumed thereby increases approximately as the cube of the engine speed increase, whereas the necessary speed for the fan, as an agency for inducing heat-exchanging air flow through the radiator, in most cases does not increase in proportion to the engine speed.

It is, therefore, the object of this invention to provide in an accessory-driving mechanism, a slippable coupling which will operate automatically with increased slippage as the driving or engine speed increases, thereby reducing the speed of, and the power consumed by the driven accessory.

Another object of the invention is to produce such an accessory drive in which slipping of the coupling may be controlled thermostatically or otherwise, to adjust the speed of the accessory to the performance demand that it must meet.

Still a further object of the invention is to provide in an accessory drive a slippable coupling so designed and constructed as to facilitate the dissipation of heat generated as a result of the slippage.

In carrying out the invention, there is provided a fluid coupling of the shear type comprising a pair of relatively rotatable elements, one preferably in the form of a disc-like rotor and the other in the form of a casing or housing enclosing such rotor and having wall surfaces spaced therefrom to provide a chamber for a supply of fluid. One or both of the coupling elements may be provided with means capable of creating a toroidal circulation of the fluid during periods in which the two elements are operating at different speeds, such fluid circulation serving to promote the dissipation of heat generated by the friction resulting from the slippage.

A feature of the invention resides in providing the inner walls of the casing or housing, as well as any torque plate or rotor wherein such members are caused to rotate relative to each other, with a series of fluid passage grooves preferably extending across the operating face thereof, substantially tangentially to the inner rim portion thereof, the walls defining said grooves being arranged to converge as they approach the peripheral portion for developing hydraulic pressure tending to separate the adjacent operating faces of the housing or plate and the rotor.

Wherein it may be desired to impose a control on the relative amount of slippage, one or more rotors and one or both of the casing walls defining the chamber within which the rotor or rotors operate, are made axially adjustable relative to each other, or the rotor may be mounted for free axial movement, thereby making it possible to vary the thickness of the fluid film between the opposed faces of the rotor and the casing walls or an auxiliary wall plate. Various arrangements to effect relative axial displacement to vary the thickness of the fluid film may be employed, as more particularly hereinafter described.

If desired, the speed of the driven accessory may be effected automatically in response to the demand thereon. As such a device operates, any tendency toward increased speed of the accessory is reflected as an increase of the torque which must be applied thereto and transmitted through the fluid coupling, and such increased torque automatically effects an increase in slippage. Thus the speed of the driven element or accessory would increase at a lesser rate than the driving element or engine.

Other features of the invention will be made more apparent and be more particularly pointed out in the following specification and claims.

The full nature of the invention will be understood from the accompanying drawings and the following description and claims.

Fig. 3 is a section taken axially through a modified form of fluid coupling employed as in the general assembly of Fig. 1, with parts removed;

Fig. 4 is a front elevation of a further modification illustrating an engine-cooling fan unit with parts removed;

Fig. 5 is a side elevation of the modification shown in Fig. 4;

Fig. 6 is a section taken axially through the fan unit shown in Figs. 4 and 5;

Fig. 7 is the same as Fig. 3 showing a further modified form of fluid coupling;

Fig. 7–A is a plan view of the torque plate as shown in Fig. 7 with parts broken away;

Fig. 7–B is a plan view of the inner face of the housing end cover of Fig. 7 with parts broken away.

Fig. 8 is the same as Fig. 7, showing a modified form thereof;

Fig. 9 is the same as Fig. 3, showing a further modification thereof; and

Fig. 10 is the same as Fig. 3, showing a still further modification of fluid coupling.

Figure 1:
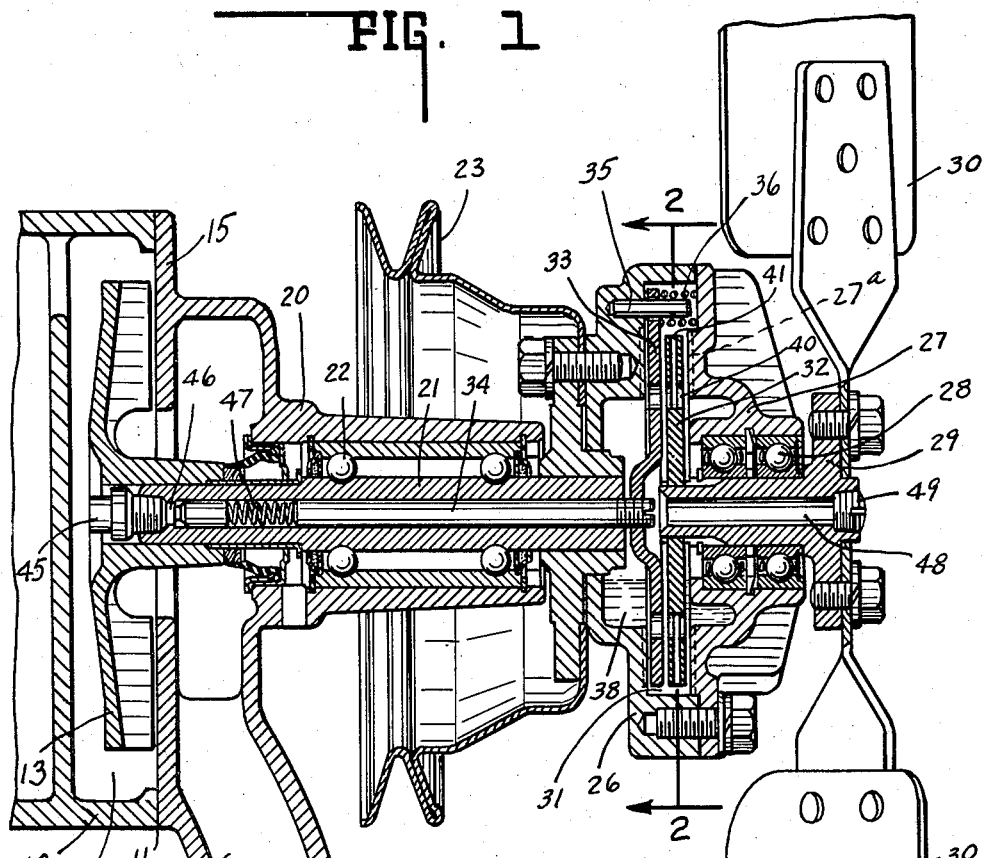
Fig. 1 is a section taken axially through a fluid coupling for an engine cooling fan, illustrative of one modification of the invention.
Figure 2:
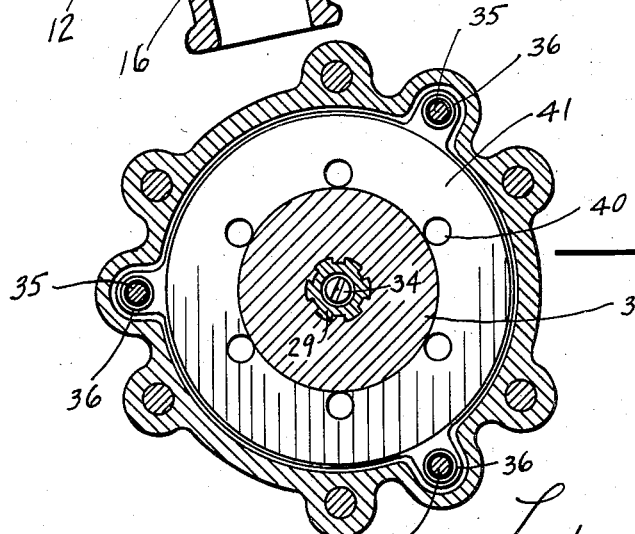
Fig. 2 is a section taken on the line 2—2 of Fig. 1.

Reference being had to Figs. 1 and 2 illustrative of one modification of the invention, and as particularly applied to an engine cooling fan, there is shown a portion of a water jacket 10 in an internal combustion engine formed as at 11 to provide a chamber 12 for a pump-impeller 13 by which liquid coolant is circulated through the water jacket and an associated radiator (not shown). The open side of the chamber 12 is closed by a cover plate 15 providing an inlet 16 connected to the radiator and communicating with the pump chamber 12. The cover plate has an outwardly projecting hub 20 in which a pump shaft 21 is supported by the anti-friction bearings 22. The pump shaft extends in both directions beyond the axial limits of the hub 20, carrying the pump-impeller 13 at one end and a drive pulley 23 at the other end, said drive pulley being adapted for connection to the engine crank shaft in the usual manner as through the medium of a belt (not shown).

Secured to the pulley and shaft for rotation therewith, there is a housing or casing comprising a cup-like element 26 having secured thereto an end cover 27 carrying antifriction bearings 28 rotatably supporting a fan hub 29 projecting outwardly beyond the cover 27 for receiving and supporting the blades 30 of a radiator cooling fan. Said fan hub 29 extends inwardly into a fluid chamber 31 within the housing enclosed between the cup-like element 26 and cover 27.

The inner end of said fan hub carries a disc-like rotor 32 splined thereto so that it may slide axially thereof while being rotatably driven thereby. The inner face of the cover 27 is desirably plane over a substantial radial extent so that it will lie in opposed parallel face-to-face relation with the rotor 32, and is formed with a series of grooves 27a hereinafter described in connection with Fig. 7-B. On the opposite side of said rotor there is located within the housing a circular plate 33 which plate lies in opposed parallel relation to the rotor and is secured to the end of an adjusting rod 34 which slidably extends through an axial opening in the shaft 21. The housing element 26 carries an annular series of pins 35 extending freely through openings in the plate 33 which serve both to drive said plate with the housing and as guides for the compression springs 36 which act between the inner surface of the cover 27 of the housing and said plate 33 to bias or urge the latter rearwardly or away from the rotor 32 to the extent permitted by the axial displacement of the rod 34 or the inner face of the housing element 26. The rod 34 may be controlled in its axial displacement by any suitable means as hereinafter more particularly described, being displaced in opposition to its bias by springs 36 to vary the plate 33 in its spacing from the rotor.

The chamber 31, enclosed and sealed within the housing 26, 27, contains a supply of fluid 38 which, when the housing is rotated, is distributed around the outer periphery of the chamber by the action of centrifugal force. The quantity of fluid is so proportioned that when centrifugally distributed, it will overlap the periphery of the rotor 32 to a substantial extent. When the housing is at rest, the fluid will settle to the bottom thereof under the influence of gravity, and the housing is desirably so designed that the level of fluid so collected will lie below the bearing seals.

Within the limits occupied by the fluid when distributed centrifugally around the periphery of the chamber, the rotor 32 is provided with an annular series of openings 40 extending therethrough. Said rotor is further provided with an inner passage space 41 extending radially inward from its periphery to communicate with the respective openings 40.

In the modification thus far described, the application of a driving force to the pulley 23 will rotate the housing 26, 27, and cause the fluid in the chamber 31 to be distributed circumferentially around the outer periphery thereof.

Due to the shearing action on the fluid resulting from rotation of the housing and plate 33, torque will be transmitted through the fluid to the rotor 32 and thence to the hub 29 and fan 30, thus causing the fan to rotate. However, since the fluid is incapable of transmitting torque without some slippage, the fan will be driven at a speed below that of the housing. As the speed of the housing increases, the speed of the fan will likewise tend to increase; but as rotation of the fan at the higher speed requires rapidly rising torque, the slippage between the housing and the rotor 32 will increase.

The torque transmitted to the rotor 32 at any given rotational speed of the housing will depend principally on the viscosity of the fluid and upon the spacing between each face of the rotor and the opposed faces of the cover 27 and plate 33, the transmission of high torque being favored by the use of high viscosity and narrow spacing between the rotor and opposed faces of the cover and plate. Since the torque is transmitted from the housing and plate through the fluid to the rotor, and the average angular velocity of the fluid will be greater than that of the rotor, the centrifugal force acting on the fluid at the sides of the rotor will be greater than that acting on the fluid in the holes 40 and passages 41. A circulation of the fluid will therefore result, the fluid flowing radially outward along the sides of the rotor, radially inward through the passages 41 and axially outward through the holes 40 back to the sides of the rotor. Such circulation of fluid aids materially in the dissipation of the heat generated as a result of the aforesaid slippage.

In designs where the rotor is the driving member, as hereinafter described, the circulation of the liquid is reversed. Since the angular velocity of the fluid within the rotor is greater than that of the fluid between the rotor and the housing or plate, centrifugal force will cause the fluid to circulate radially outward through the rotor and radially inward along the outer sides of the rotor and thence axially inward within the rotor.

As noted above, one of the factors controlling the torque transmitted to the rotor is the space or width of the gap between each of its outer side faces and the opposed surfaces of the cover 27 or plate 33. It is therefore possible to control the torque transmitted at any speed by controlling the axial position of the plate 33. For this purpose, there is shown mounted at the center of the pump-impeller 13 a temperature-responsive element 45 of known type which includes a pin or piston 46 that is projected from the element under the influence of rising temperatures. By operatively connecting the piston 46 to the rod 34 on which the plate 33 is carried, the plate 33 will be moved toward the rotor as the piston 46 is projected from element 45 under the influence of increases in the temperature of the coolant flowing through the pump. Such movement of the plate 33 reduces the width of the gap at the sides of the rotor 32, or the effective width of the chamber 31, and thus promotes increase in the torque transmitted through the fluid to such rotor. Such action tends to increase the speed of the fan 30 relative to the speed of the driving housing.

In this manner, the speed of the fan may be automatically controlled in accordance with the temperature of the coolant so that the fan will not operate faster than required, and therefore not absorb more power than is necessary to maintain the coolant at a predetermined maximum temperature. If the piston 46 of the said element should project therefrom to an extent sufficient to cause the rotor 32 to be clamped between the plate 33 and the cover 27, it is desirable to provide an axially resilient member 47 in the operative connection between the piston 46 and rod 34. The compressibility of the member 47 will serve to prevent the application to the temperature-responsive element, of forces sufficient to damage it.

To vary the effect of the temperature-responsive control provided by the element 45, the plate 33 may be manually adjusted with respect to the rod 34. As shown in Fig. 1, the driving plate 33 is threadably mounted on the end of the rod 34 in alignment with an axial passage 48 extending through the hub 29. Said passage will normally be closed by the screw-threaded plug 49 to prevent the escape of fluid from the housing. By removing the plug 49 a tool may be inserted through the passage 48 into engagement with a transverse slot provided in the end of the rod 34 for rotating it relative to the plate 33 and thereby adjust the position of said plate relative thereto. Also, the passage 48 may be employed for introducing fluid into the chamber 31.

In the modified form of fluid drive illustrated in Fig. 3, the rotor becomes the driving element and the housing carrying the fan hub or other accessory becomes the driven element. Thus, the driving pulley 123 is secured to a flange 124 terminating in an outwardly extending hub 125. Surrounding the hub 125 there is a housing comprising the member 126 to which is secured a closure or cover 127 forming therebetween a chamber 128 for receiving the fluid 129a. The housing is freely rotatable about the hub 125 being supported thereon by the bearing members 129 through the medium of an inwardly extending portion 130 of the housing member 126. The housing carries an accessory, such as a cooling fan, indicated at 131, for rotation therewith.

The extended end of the hub 125 is provided with an annular series of splines, indicated at 132. Slidably mounted in said splines to be driven thereby there is a pair of abutting cup-shaped rotor members 133 terminating outwardly and radially in the rotor plate 134 slightly spaced apart and jointly driven by the hub 125. Said rotor plates are held apart in slightly spaced relation by their cup-like portions 133 to provide the rotor with a radially extending fluid passage 135 connecting with an annular series of holes 136 inwardly thereof for the toroidal passage of fluid therethrough. The outer faces of said plates are also normally spaced from the inner faces of the housing or walls of the chamber 128.

The hub 125 is secured to a hollow driving shaft 121, through which said temperature-responsive rod 34 extends from a thermostatic element, as above described. The outer free end of the rod abuts a shift pin 137 having its outer end reduced, terminating in a beveled camming surface 138. Said shift pin is provided inwardly with a sealing structure 139 and is spring biased against the action of the rod and thermostatic element by the spring 140. The hub 125 is provided with an annular series of ball-receiving pockets each retaining a camming ball 141 which extends into camming or wedging engagement between the reversably arranged flanges of the rotor plates.

This arrangement is such that upon the hollow shaft 121 being driven by the engine or other source of power, the rotor plates are thereby driven which, through the shearing action of the fluid 129a drives the housing which in turn drives the fan 131 or other accessory. During such driving action, the fluid pressure developed about the periphery of the rotor will cause the fluid to circulate radially outwardly through the passage 135 and inwardly through the space between the rotor and walls of the chamber.

To vary the speed of the drive thermostatically, upon a rise in temperature the rod 34 will be thrust forwardly against the biasing spring 140, causing the reduced camming end 138 to force the camming balls 141 radially outward between the nested rotor cups 133, thereby causing the rotor plates to be spread apart, each approaching its adjacent wall of the fluid chamber to thereby decrease the space therebetween. This action results in a decrease in the slippage with the consequent approach to a wet clutch action. Thus, as the rotor discs are spread apart by the thermally-controlled rod 34, the speed of rotation of the fan or other accessory will more closely approach the driving speed of the driving rotor.

A further modification of the fluid coupling is shown in Figs. 4, 5 and 6, having to do particularly with the toroidal circulation of the fluid for eliminating hot spots and dissipating the heat generated through the fluid friction. In this structure, the driving or torque-producing element includes the fan pulley 223 mounted on the water pump driving shaft 121, said pulley being driven in the usual manner from the crank shaft of the engine. Secured to the face of the fan pulley by the plate 228, there is a driven spindle 229 upon which the fluid housing, comprising the cup-like element 226 and cover 227, is mounted for free rotation about the anti-friction bearing 228. The radiator cooling fan blades 230 are secured to the cup-like element 226 for rotation with the housing.

The arrangement shown is adapted to be applied to an internal combustion engine in the usual manner and as illustrated in Fig. 1, there being the usual radiator indicated generally at A (Fig. 6) arranged on the opposite side or forwardly of the housing and fan blades. The fan blades are mounted on the fluid coupling housing for developing a flow of air through the radiator.

The housing 226, 227 encompasses a fluid chamber 231 which chamber includes a reservoir portion indicated at 231a. A rotor 232 is secured to the end of the spindle 229, to be driven by the shaft 121 and pulley 223, the rotor thereby becoming the torque-producing element for effecting a variable drive of the housing and fan through the fluid coupling. The fluid chamber 231 contains a supply of fluid indicated at 238 preferably having a normal level, when the coupling is at rest, below the seals of the anti-friction bearings 228.

The rotor, as described in respect to Fig. 1 extends radially between the housing element 226 and its cover 227 in closely spaced face-to-face parallel relation with the chamber walls defined thereby so that a relatively thin film of fluid may pass therebetween and also between the circumferential periphery of the rotor and chamber. The rotor is formed of two spaced plates 232a and 232b, the space therebetween providing a radial fluid passage 241 which communicates with the transverse holes in said plates indicated at 240.

The cover 227 of the housing is, as best shown in Fig. 4, provided with a series of thin outstanding peripheral fins 248 extending radially outwardly and forwardly thereof for effective heat radiation and dissipation.

In the above described internal combustion engine cooling fan unit, wherein the rotor is directly driven from the engine crankshaft through the pulley, and the housing carrying the fan blades is driven from the rotor through the shearing action of the fluid within the chamber, the fluid will possess an angular velocity greater than that of the housing, and the fluid pressure caused by centrifugal force will therefore be less in the spaces at the sides of the rotor than in the radial passage 241. As a result, the fluid will circulate radially inwardly along the walls of the chamber, through the holes 240, and outwardly by way of the passage 241. Said holes 240 in the rotor also provide free passage for the fluid from one side of the rotor to the other to thereby equalize the fluid pressure on both sides of the rotor. Such toroidal circulation of the fluid as above described has an important effect of removing hot spots which would otherwise be developed by the frictional shearing action and aid in transmitting the heat to the housing for radiation and dissipation through the medium of the cooling fins 248.

Still a further modification of the fluid coupling having some aspects of a wet clutch is shown in Fig. 7. In this structure, the rotor is the driving member and the housing is the driven member. A cooling fan or other accessory to be driven is secured to the housing. However, it is to be understood that the driving and driven members may be reversed wherein the housing becomes the driving member with the rotor becoming the driven member, and wherein the cooling fan or other accessory is suitably connected with the rotor to be driven thereby.

In this modification, a portion of the driving pulley is indicated at 323 being secured to a hollow shaft 321 which may drive the water pump. A thermally controlled rod 34 extends therethrough into abutting engagement with shift pin 337 having a flanged sealing structure at 339 against which the biasing spring 340 abuts.

The housing, including the housing member 326 and cover 327 is rotatably carried on the hub 325 which extends from the flange 324 secured to the driving pulley. The housing element 326 is formed with an inwardly extending bearing sleeve 330 for supporting the housing for free rotation about the anti-friction bearings 329 carried by said hub 325.

A centrally disposed axially floating torque transmitting plate 335 (see Fig. 7–A) is axially slidable within but rotatable with the housing, extending inwardly from the inner periphery thereof. Said torque plate is provided about its periphery with a series of driving lugs 335a slidably keyed on the inwardly extending peripheral key ways 335b formed about the inner peripheral wall of the housing. Adjacent thereto, said plate is provided with a series of interposed notches 335c to permit fluid circulation therethrough. Said torque plate is formed in two sections slightly spaced apart to provide a radially disposed fluid passage indicated at 335d. The two sections of the torque plate are rigidly secured to provide a single unit by spot-welding or the like. The exposed surface of each section of the torque plate is provided with an annular series of spaced grooves as indicated at 335e. Said grooves are arranged to extend across said surface or face of the plate substantially tangential to the inner rim portion thereof, as shown in Fig. 7-A, with their defining walls being outwardly converging toward the outer rim portion for scooping up and directing the passage of fluid therethrough as indicated by the arrows due to the direction of rotation relative to the rotor. The converging form of the walls has the further effect of developing a hydraulic pressure tending to separate the adjacent operating faces of the torque and rotor plates and housing when the thermo-element retracts.

Extending radially outwardly between opposite sides of said torque plate and the opposed inner surfaces of the housing there is a rotor 334 comprising rotor plates 334a and 334b. The surfaces of said rotor plates adjacent the torque plate and housing are preferably provided with non-metallic clutch faces. The inner wall of the housing cover which lies in face-to-face relation with the rotor plate 334a is also provided with a series of outwardly converging fluid circulating grooves 327a, extending across said wall substantially tangential to the inner rim portion of its face, said grooves extending in a direction to induce the flow of fluid outwardly therethrough. The converging walls of the grooves as shown in Fig. 7-B also has the further effect of developing a hydraulic pressure tending to separate the adjacent operating faces of the housing and rotor plates. As heretofore described, said rotor plates are each provided with a series of holes spaced inwardly from their peripheries as indicated at 336. The housing carries a supply of fluid indicated at 329a which, when the unit is stationery, preferably lies below the seals of the bearings 329.

The rotor 334 of this modification is arranged so that the rotor plate 334b is axially displaceable under thermal control through the axial movement of the rod 34 and the shift pin 337.

The rotor plate 334b is formed with a cylindrical cup-shaped portion 338 which is secured by the dowel pins 341 to a flexible plate 342, said plate in turn being secured to the forward end of the shift pin 337. Thus as the shift pin is axially displaced by the thermally controlled rod 34 against the tension of spring 340, it will shift the rotor plate 334b toward the torque plate 335. On the other hand, the rotor plate 334a is mounted to axially float upon the periphery of the cup portion 338 and driven thereby along with the rotor plate 334b. A cup-like support 333 nests within the cup portion 338 to provide a sliding bearing therefor, and in its forward face is provided with an annular series of openings 338a which slidably fit over the inwardly extending body portions of the dowel pins 341. Inwardly, said cup-like support 333 is formed with a rearwardly extending cylindrical flange press fitted on the hub 325 to be driven thereby, and through which the axially displaceable rotor plates 334a and 334b are driven.

The arrangement of this modification is such that the rotor drives the housing through the shear action of the fluid contained therein which lies between the adjacent faces of the rotor plates, torque plate and inner walls of the chamber 328, as above described. Also as above described, there will be a toroidal circulation of fluid outwardly between the relative rotating faces of the rotor, torque plate and housing, and through the grooves 335e in the plate and the grooves 327a of the housing. The path of circulation will then move inwardly through the axial passage 335d of the torque plate and laterally through the holes 336 of the rotor.

When the cooling system is relatively cold, the driving effect of the fluid will be at a minimum with the rotor plates and torque plate spaced apart within the chamber 328 due to the fluid pressure therebetween. As the thermal action takes place with the consequent forward shifting of the rod 34 and shift pin 337, the actuated rotor plate 334b will be displaced toward the torque plate, reducing the fluid film between their surfaces. This action will cause the torque plate to be shifted on its key-way toward the rotor plate 334a. Since this plate is slidably mounted, it will in turn be shifted toward the adjacent face of the fluid chamber or housing cover 327. Thus the space between the several faces will be decreased and thereby decrease the relative slippage to effect an increase in the driving torque transmitted to the housing and cooling fan. The relative rotation between these parts will continue to be decreased until the non-metallic face of rotor plate 334b is in wet clutch engagement with the adjacent face of the torque plate which in turn is moved to wet clutch engagement with the non-metallic face of the rotor plate 334a, the opposite face of which is moved to wet clutch engagement with the inner face of the housing cover 327. Thus at the maximum thermal displacement of the rod 34, the non-metallic faces of the relative rotating members will approach a wet clutch action. The fluid therebetween other than a thin film will be displaced to circulate through the grooves as above described; still maintaining the toroidal circulation to distribute the heat developed from the slippage for dissipation through the heat-radiating fins 343 of the housing.

In the modification illustrated in Fig. 8, the structure is in all respects the same as that shown in Fig. 7 other than that the torque plate 335 is secured to the housing so as to be fixed and not slidable or axially floating, reference being made to Fig. 7-A. The ears 335a are clamped between the housing member 326 and the housing cover 327. The same provision for toroidal fluid circulation is provided in this structure as above described with respect to Figs. 7 and 7-A. However, the rotor plates indicated in this modification as 434a and 434b are jointly axially displaceable and rotatable as a fixed unit; their cup-like formation 438 and 438a being press fitted together with the inner member 438a press fitted or otherwise secured to the hub 325 for driving the rotor unit, and the outer said member 438 being secured to the flexible plate 342 for axial displacement by the rod 34.

As above described in respect to Fig. 7, the face of rotor plate 434a is provided with a non-metallic facing for wet clutch action with the adjacent inner face of the housing cover. Likewise the face of plate 434b is similarly lined for wet clutch action with the adjacent face of the torque plate. Both rotor plates are driven in unison from the fan pulley relative to the torque plate and the housing.

Normally there will be sufficient space between the adjacent faces of the rotor plate and those of the torque plate and housing cover to permit of substantial slippage when the cooling system is cold. As the cooling system heats up, the rotor plates will both be displaced to the right to reduce the spacing and increase the driving torque through the shearing action of the fluid to increase the relative driven speed of the housing and fan until the displacement is such that their non-metallic faces come into wet clutching action with the torque plate and housing cover to approach a direct drive thereof.

In respect to both Figs. 7 and 8, the yielding plate 342 provides a safety factor in respect to over-loading through extreme axial displacement of the thermally controlled rod 34. At such time as the clutch faces reach their extreme positions, further displacement of the rod 34 will be taken up by the yielding plate 342. Whereas in the modification of Fig. 7 there is provided three face-to-face couplings by reason of the axial displacement of the torque plate and the floating action of one of the rotor plates, in the modification of Fig. 8 there will be provided two coupling surfaces as the forward shifting of rod 34 develops.

In the modification of Fig. 9, the structure is in most respects similar to that of Figs. 7 and 8 wherein the rotor comprises rotor plate 534a for movement toward and from the adjacent face of the housing cover 327. Said rotor plate is slidably keyed at 332 to the driving hub 325 to be driven thereby. The shift pin 337 is secured thereto through the flexible plate 342. Also mounted on the hub 325 and driven thereby, there is a corresponding rotor plate 534b positioned adjacent the plate 534a. Its inner hub drive is press-fitted or otherwise secured to the hub so that it is not axially slidable or displaceable relative thereto. Both of said rotor plates are provided with the openings 336 to permit toroidal circulation of the fluid inwardly between the rotor and housing and radially outwardly through the passage provided by the spacing of said plates as indicated at 435.

This modification is such that the rotor comprises two spaced plates, one of which remains in fixed axial position relative to the housing while the other plate having a non-metallic face is axially shiftable toward the adjacent face of the housing cover so that in its extreme shifted position, it will effect a wet clutch action therewith, whereas in its intermediate shiftable positions, it will vary the relative rotation between the driving and driven members in accordance with the shearing action of the fluid.

The modification illustrated in Fig. 10 is in most respects similar to that of Figs. 8 and 9. In this structure, the rotor plate 634a is secured as by press fit to the rotor plate 634b and is slightly spaced therefrom to provide a radial passage 635 therebetween, said rotor plates being provided with the holes 636 to permit of toroidal circulation of the fluid as above described. The rotor, comprising said press-fitted plates, is carried by a cup-shaped portion 638 inwardly flanged at 332 for splining on the hub 325 to be driven thereby while axially displaceable relative thereto through the connection between the shift rod 337 and flexible plate 342.

In this modification, the action is substantially as above described in respect to the other modifications so far as fluid coupling and toroidal fluid circulation is concerned, but wherein the rotor including both rotor plates is axially shifted within the fluid chamber toward and away from the opposed side walls thereof, being movable under thermal control to decrease the slippage and increase the driving torque until wet clutching action occurs between the driving and driven elements.

While the invention has been disclosed and described in some detail in the drawings and foregoing description of the several modifications, they are to be considered as illustrative and not restrictive in character, as other modifications may readily suggest themselves to persons skilled in this art and within the broad scope of the invention, reference being had to the appended claims.

The invention claimed is:

1. In a fluid coupling, the combination of a torque-producing element and an accessory element to be driven thereby, a fluid retaining housing connected with one of said elements having opposed radially extending faces defining opposite sides of a chamber containing a supply of fluid, a rotor mounted for rotation in said chamber relative to said housing with its side surfaces extending in face-to-face parallel normally spaced relation with the faces of said housing, and means for connecting said rotor with the other said element whereby torque will be transmitted through the shearing action of the fluid from one of said elements to the other, said rotor and housing being formed to provide a fluid passage for creating a toroidal fluid circulation enclosing the peripheral portion of said rotor when said elements are operating at different speeds.

2. In a fluid coupling, the combination of a torque-producing element and an accessory element to be driven thereby, a fluid retaining housing connected with one of said elements having opposed radially extending faces defining opposite sides of a chamber containing a supply of fluid, a rotor mounted for rotation in said chamber relative to said housing with its side surfaces extending in face-to-face parallel normally spaced relation with the faces of said housing, and means for connecting said rotor with the other said element whereby torque will be transmitted through the shearing action of the fluid from one of said elements to the other, said rotor having a radially extending fluid passage communicating with the periphery thereof and a transverse opening therethrough to create a toroidal circulation of the liquid when said elements are operating at different speeds.

3. In a fluid coupling for connecting a torque-producing element and an accessory element to be driven thereby, a fluid-retaining housing connected with one of said elements having opposed radially extending members defining opposite sides of a chamber containing a supply of fluid, a rotor member mounted for rotation in said chamber relative to said chamber-defining members with its side surfaces extending in face-to-face parallel normally spaced relation therewith, means for connecting said rotor member with the other said element whereby torque will be transmitted through the shearing action of said fluid from one of said elements to the other, and a temperature-responsive means associated with one of said elements operably connnected with one of said members to vary the parallel spaced relation therebetween and thereby vary the shearing action of the fluid and torque transmission therethrough.

4. In a fluid coupling for connecting a torque-producing element and an accessory element to be driven thereby, a fluid-retaining housing connected with one of said elements having opposed radially extending members defining opposite sides of a chamber containing a supply of fluid, a rotor member mounted for rotation in said chamber relative to said chamber-defining members with its side surfaces extending in face-to-face parallel normally spaced relation therewith, means for connecting said rotor member with the other said element whereby torque will be transmitted through the shearing action of said fluid from one of said elements to the other, and a temperature-responsive means associated with one of said elements operably connected with one of said members to vary the parallel spaced relation therebetween and thereby vary the shearing action of the fluid and torque transmission therethrough, said members being formed to provide a fluid passage to create a toroidal fluid circulation about the peripheral portion of said rotor member when said elements are operating at different speeds.

5. In a fluid coupling, the combination of a torque-producing element and an accessory element to be driven thereby, a fluid-retaining housing connected with one of said elements having opposed radially extending members defining opposite sides of a chamber containing a supply of fluid, a rotor member mounted for rotation in said chamber relative to said chamber-defining members with its side surfaces extending in face-to-face parallel normally spaced relation therewith, means for connecting said rotor member with the other said element whereby torque will be transmitted through the shearing action of said fluid from one of said elements to the other, and a temperature-responsive means associated with one of said elements operably connected with one of said members to vary the parallel spaced relation therebetween and thereby vary the shearing action of the fluid and torque transmission therethrough, said rotor member having a radially extending fluid passage communicating with the periphery thereof and a transverse opening therethrough to create a toroidal circulation of the fluid when such elements are operating at different speeds.

6. In a fluid coupling, the combination of a torque-producing element and an accessory element to be driven thereby, said coupling comprising coaxial relatively rotatable driven and driving members, one of said members comprising a disc-like rotor and the other said member comprising a housing enclosing said rotor, an axially movable plate disposed in said housing and rotatable therewith, said housing and plate having surfaces of substantially radial extent respectively opposed to opposite faces of the rotor, said rotor and plate being axially movable with respect to said housing and to each other, a supply of fluid in said housing, and means for controlling the axial spacing between said plate, rotor and housing.

7. In a fluid coupling, the combination as set forth in claim 6, characterized by the means for controlling the axial spaces between said plate, rotor and housing comprising a temperature-responsive element.

8. In a fluid coupling, the combination as set forth in claim 7 with the addition that said housing is the driving element of the coupling, a shaft on one end of which said housing is secured, said shaft having an axial passage therethrough, a coolant-circulating pump secured to the other end of said shaft, a rod slidable through the said passage in said shaft, said plate being secured to one end of said rod, and said temperature-responsive element being mounted in said pump and operably connected to said rod to effect axial displacement of said plate upon temperature increase in said pump and thereby reduce the axial spaces between said plate, rotor and housing.

9. In a fluid coupling, the combination as set forth in claim 6 with the addition that said rotor is provided with an annular series of holes extending axially therethrough and a passage extending radially from said holes to the periphery of the rotor, said holes and passage providing a path for forced circulation of fluid about the outer peripheral portion of said rotor.

10. In a fluid coupling, relatively rotatable driving and driven elements, one of said elements consisting of a disc-like rotor and the other said element consisting of a housing enclosing said rotor, the inner surfaces of said housing being spaced from said rotor, and a supply of fluid in said housing for transmitting torque between the said elements, one of said elements being provided with a radially extending passage communicating at its opposite ends with the space between the rotor and housing and providing a path for forced circulation of the fluid about the outer peripheral portion of the rotor.

11. In a radiator cooling fan unit for internal combustion engines, the combination with a drive shaft adapted to be driven by the engine, of a spindle secured thereto, a fan hub mounted on said spindle for rotation relative thereto, fan blades secured to said hub, said hub comprising a housing enclosing a fluid chamber having radially extending parallel spaced walls terminating inwardly thereof in a fluid-receiving reservoir, torque-transmitting fluid in said reservoir, a disc-like rotor secured to said spindle for rotation therewith extending radially between said walls in closely spaced parallel relation therewith for transmitting torque through the fluid to said housing, said rotor having a radial fluid passage extending from its outer periphery inwardly into communication with an annular series of holes therein to provide a path for toroidal circulation of the fluid outwardly through said passage and inwardly along the walls of said chamber to remove hot spots and transfer heat generated thereby to said housing, and an annular series of outwardly extending radiating fins formed on said housing for radiating and dissipating the heat conducted thereto by the toroidal circulation of the fluid.

12. In a radiator cooling fan unit for internal combustion engines, the combination with a drive shaft adapted to be driven by the engine, of a spindle secured thereto and projecting axially toward the radiator, a fan hub mounted on bearings surrounding said spindle for rotation relative thereto, fan blades secured to said hub, said hub comprising a housing enclosing a liquid chamber having radially extending parallel spaced walls terminating inwardly thereof in a liquid-receiving reservoir, torque-transmitting fluid in said reservoir, a rotor secured to said spindle for rotation therewith having spaced plates extending radially between said walls in closely spaced parallel relation therewith for transmitting torque through the fluid to said housing, the space between said plates providing a fluid passage extending from their outer periphery inwardly into communication with an annular series of holes therein to provide a path for toroidal circulation of the fluid outwardly through said passage and inwardly along the walls of said chamber to remove hot spots and transfer heat generated thereby to said housing, and an annular series of outwardly extending radiating fins formed on said housing directed into the air flow developed by said fan for radiating and dissipating the heat conducted thereto by the toroidal circulation of the fluid.

13. In a fluid coupling, the combination of a torque-producing element and an accessory element to be driven thereby, a fluid-retaining housing connected with one of said elements having opposed radially extending faces defining opposite sides of a chamber containing a supply of fluid, a rotor mounted for rotation in said chamber relative to said housing, said rotor comprising a pair of separate plates arranged in face-to-face relation with their respective outer side surfaces extending in face-to-face parallel normally spaced relation with the faces of said housing, means for slidably connecting said rotor plates with said other element for rotation therewith while permitting relative axial displacement of said plates and housing, and a temperature-responsive means in said coupling operably connected with one of said plates to shift said plates axially relative to each other and the faces of said housing for controlling the torque transmitted through the shearing action of said fluid from one of said elements to the other, the plates of said rotor being provided with an annular series of holes spaced inwardly from the peripheries thereof to provide a fluid passage between said plates for creating a toroidal circulation of the fluid about the peripheral portion of said plates when said elements are operating at different speeds.

14. In a fluid coupling, the combination of a torque-producing element and an accessory element to be driven thereby, a fluid-retaining housing connected with one of said elements having opposed radially extending faces defining opposite sides of an annular chamber containing a supply of liquid, a rotor mounted for rotation in said chamber relative to said housing, said rotor comprising a pair of separate plates arranged in face-to-face relation with their respective outer side surfaces extending in face-to-face parallel normally spaced relation with the faces of said housing, means for slidably connecting said rotor plates with said other element for rotation therewith while permitting relative axial displacement of said plates and housing, and a temperature-responsive means in said coupling operably connected with one of said plates to shift said plates axially relative to each other and the faces of said housing for controlling the torque transmitted through the shearing action of said fluid from one of said elements to the other.

15. In a fluid coupling, the combination with a torque-producing element and an accessory element to be driven thereby, of a fluid retaining housing connected with one of said elements having opposed annular faces defined by inner and outer rim portions to provide side walls of a chamber containing a supply of fluid, a rotor mounted for rotation in said chamber relative to said housing, means for slidably connecting said rotor with the other said element to be driven thereby whereby torque will be transmitted through the shearing action of the fluid from one of said elements to the other, said rotor comprising a pair of spaced rotor plates, one of said plates being provided with a non-metallic surface for wet clutching engagement with the adjacent face of said housing, and thermally controlled means for axially shifting said rotor to move its said surface toward wet clutching action with the said face of said housing.

16. In a fluid coupling, the combination as set forth in claim 15 with the addition that said housing face is provided with a series of fluid passage grooves extending across said face substantially tangentially to its inner rim portion, said grooves being defined by walls converging toward said outer rim portion to cause hydraulic pressure to be exerted between said housing and rotor.

17. In a fluid coupling, the combination as set forth in claim 15 wherein said housing carries an axially displaceable torque plate extending inwardly from the peripheral wall thereof between said rotor plates, means for mounting said rotor plates for axial displacement relative to each other, said torque plate and housing, said thermally controlled means being operable to shift one of said rotor plates toward said torque plate and cause said torque plate to shift the other rotor plate toward one face of said housing for wet clutching action therebetween.

18. In a fluid coupling, the combination as set forth in claim 15 wherein said housing carries an annular torque plate extending inwardly from the periphery thereof between said spaced rotor plates, one of said rotor plates being axially shiftable by said thermally controlled means toward wet clutching action with said torque plate, the opposed operating faces of said plates being defined inwardly by an annular inner rim portion, and a series of fluid passage grooves extending across the face of one of said plates substantially tangentially of said inner rim portion, each groove being defined by walls converging toward its peripheral portion to develop a hydraulic pressure therebetween tending to separate said plates.

19. In a fluid coupling, the combination set forth in claim 15 wherein one of said rotor plates is fixed to said one of said elements and the other said rotor plate is rotatable therewith while axially shiftable by said thermally controlled means relative to said fixed plate into and out of wet clutching engagement with the adjacent surface of said housing.

20. In a fluid coupling, the combination of a torque-producing element and an accessory element to be driven thereby, a fluid containing housing connected with one of said elements, said housing having opposed radially extending faces, a rotor mounted for rotation relative to said housing between said faces with its side surfaces extending in operating face-to-face parallel normally spaced relation therewith, means for connecting said rotor with the other said element whereby torque will be transmitted through the shearing action of the fluid from one of said elements to the other, and a series of fluid passage grooves extending over at least one operative face of said housing, the walls defining said grooves being arranged to converge as they approach the peripheral portion thereof for developing a hydraulic pressure tending to separate the rotor from said operating face of said housing.

21. In a fluid coupling, the combination of a torque-producing element and an accessory element to be driven thereby, of a fluid retaining housing connected with one of said elements having opposed annular faces defined by inner and outer rim portions and providing opposite sides of a chamber containing a supply of fluid, a rotor mounted for rotation in said chamber relative to said housing with its side surfaces extending in operating face-to-face parallel normally spaced relation with the faces of said housing, means for connecting said rotor with the other said element whereby torque will be transmitted through the shearing action of the fluid from one of said elements to the other, and an annular series of fluid passage grooves extending across at least one operating face of said housing substantially tangentially to said inner rim portion, the walls defining said grooves being arranged to converge as they approach the outer rim portion for progressively reducing the passage area to develop hydraulic pressure tending to separate the operating face of said rotor from the adjacent face of said housing.

22. In a fluid coupling, the combination of a torque-producing element and an accessory element to be driven thereby, of a fluid retaining housing connected with one of said elements containing a supply of fluid, said housing being provided with an annular operating face, a rotor mounted for rotation in said housing with an annular operating face arranged in face-to-face parallel normally spaced relation with the operating face of said housing, said operating faces being defined by inner and outer rim portions, means for connecting said rotor with the other said element whereby torque will be transmitted through the shearing action of the fluid, and an annular series of fluid passage grooves extending across at least one of said faces substantially tangentially to its inner rim portion, the walls defining said grooves being arranged to converge as they approach the outer rim portion for progressively reducing the passage area to develop hydraulic pressure tending to separate said faces.

References Cited in the file of this patent

UNITED STATES PATENTS

| 2,289,440 | Kugel | July 14, 1942 |
| 2,706,547 | Ranzi | Apr. 19, 1955 |

FOREIGN PATENTS

| 797,993 | France | Feb. 24, 1936 |
| 859,051 | France | Oct. 29, 1941 |